(12) United States Patent
Ramachandran et al.

(10) Patent No.: US 8,958,548 B2
(45) Date of Patent: *Feb. 17, 2015

(54) GENERATION OF RELATIVE PRIME NUMBERS FOR USE IN CRYPTOGRAPHY

(71) Applicant: International Business Machines Corporation, Armonk, NY (US)

(72) Inventors: Arun Ramachandran, Coimbatore (IN); Puvichakravarthy Ramachandran, Nagamalai (IN); Lakshmanan Velusamy, TamilNadu (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,121

(22) Filed: Apr. 12, 2013

(65) Prior Publication Data

US 2013/0227278 A1 Aug. 29, 2013

Related U.S. Application Data

(63) Continuation of application No. 13/344,844, filed on Jan. 6, 2012.

(51) Int. Cl.
*H04L 29/06* (2006.01)
*H04L 9/30* (2006.01)
*G06F 7/72* (2006.01)

(52) U.S. Cl.
CPC .............. *H04L 9/3053* (2013.01); *G06F 7/72* (2013.01); *H04L 9/3033* (2013.01); *G06F 2207/7204* (2013.01)
USPC .............................................. 380/28; 380/44

(58) Field of Classification Search
CPC ....... H04L 9/08; H04L 9/0816; H04L 9/0819; H04L 9/0825; H04L 9/22; H04L 9/26; H04L 9/28; H04L 9/30; H04L 9/3006; H04L 9/302; H04L 9/3033; H04L 9/3046; H04L 9/3053; G06F 7/72; G06F 2207/7204
USPC ............. 380/259, 262, 277–279, 283, 44, 46, 380/28, 30

See application file for complete search history.

(56) References Cited

U.S. PATENT DOCUMENTS 4,298,951 A 11/1981 Hall
5,825,886 A * 10/1998 Adams et al. ................... 380/28

(Continued)

OTHER PUBLICATIONS

Sharma et al., "RSA algorithm using modified subset sum cryptosystem," Computer and Communication Technology (ICCCT), 2011 2nd International Conference on, vol., no., pp. 457,461, Sep. 15-17, 2011.*

*Primary Examiner* — Eleni Shiferaw
*Assistant Examiner* — Hilary Branske
(74) *Attorney, Agent, or Firm* — Thomas E. Tyson; Gregory K. Goshorn; Greg Goshorn, P.C.

(57) ABSTRACT

The disclosed technology generates two relative prime numbers and, then, using the relative prime numbers converts a super-increasing (SI) knapsack into a non-super increasing (NSI) knapsack. The NSI knapsack becomes a public key and the corresponding SI knapsack, along with the two relative prime numbers, becomes a private key. A message is encrypted using a subset S of the private key that totals a number N. The message, the public key and the number N are transmitted to a recipient, who knows the value of the two relative prime numbers. The recipient uses the relative prime numbers to convert the public key into the private key and, then, generates the subset S by solving the private key with respect to the number N. Using the subset, the message is decrypted.

6 Claims, 8 Drawing Sheets

(56) References Cited

U.S. PATENT DOCUMENTS

| | | | |
|---|---|---|---|
| 6,785,388 B1 * | 8/2004 | Kasahara et al. | 380/28 |
| 7,668,898 B2 | 2/2010 | Manor et al. | |
| 2002/0064278 A1 * | 5/2002 | Lim et al. | 380/30 |
| 2009/0164435 A1 | 6/2009 | Routt | |

* cited by examiner

GENERATION OF RELATIVE PRIME NUMBERS FOR USE IN CRYPTOGRAPHY

CROSS-REFERENCES TO RELATED APPLICATIONS

The present application is a continuation and claims the benefit of the filing date of an application entitled, "Generation of Relative Prime Numbers for Use in Cryptography" Ser. No. 13/344,844, filed Jan. 6, 2012, assigned to the assignee of the present application, and herein incorporated by reference.

FIELD OF DISCLOSURE

The claimed subject matter relates generally to cryptography and, more specifically, to techniques for the generation of relative prime numbers for use in both public and private key cryptography systems.

SUMMARY

Provided are techniques for the generation of relatively prime numbers in both public and private key cryptography. Data encryption is often an essential element of communication among computers, particularly over public networks such as the Internet. Although some communications may not need to be encrypted, entities such as, but not limited to, banking and retail sites, simply could not operate in an environment without secure data encryption.

Two fundamental types of data are private key and public key systems. In a private key system, messages are both encrypted and decrypted with the same key, which are typically kept secret from parties other than the sender and receiver of the message. In a public key, or "asymmetric," encryption system, one key, i.e. a public key, is used to encrypt a message and a second key, a private key that corresponds to the public key, is used to decrypt the message. In this manner, a party may receive secure messages from any party with the public key, which may be freely distributed. One early public key system is the Merkle-Hellman knapsack cryptosystem, which should be familiar to those with skill in the relevant arts. Provided are techniques for selecting a multiplier (R) in accordance with a formula $R=P^I$ wherein P is a prime number and I a number is selected such that $P^I$ is less than the number of bits in every packet of a plurality of packets, the plurality of packets corresponding to a message; generating a modulus (M) wherein M is generated in accordance a formula $M=(P^N*Q^T)-1$, where N, Q and T are numbers selected such that M is greater than the number of bits in every packet of the plurality of packets; employing M and R, in accordance with a cryptography system, to encrypt each packet of plurality of packets to generate a plurality of encrypted packets; aggregating the plurality of encrypted packets to generate an encrypted message; and transmitting the encrypted message. Criteria corresponding to P, Q, N and T include, but are not limited to, P and Q do not need to be prime numbers; N>1; and, as a result of the operations, M is greater than the length of any particular packet in a message to be encrypted.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
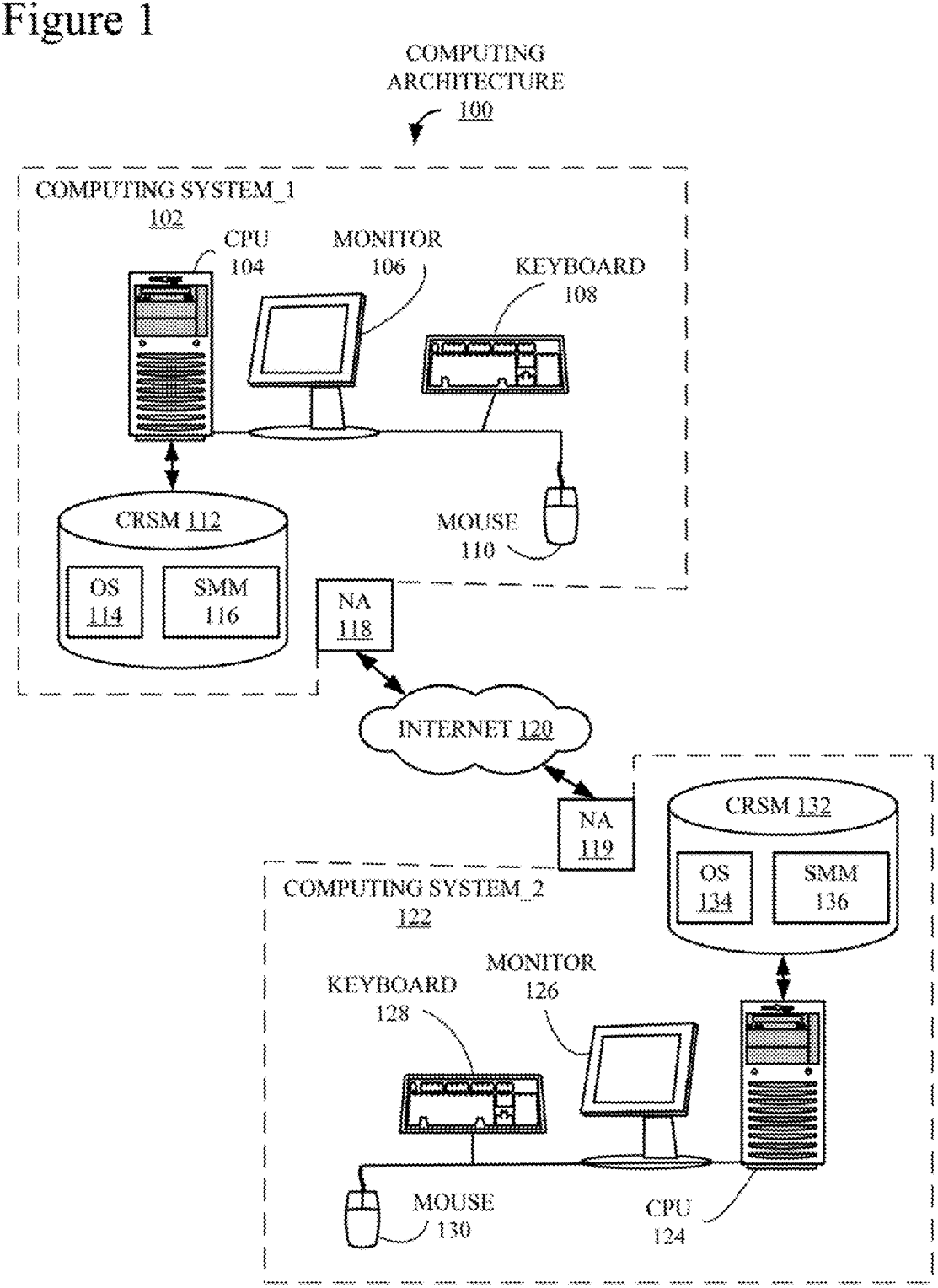
FIG. 1 is a block diagram of a computing architecture that may support the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Most private key cryptography systems that involve modulo arithmetic spend a considerable amount of computing time generating prime numbers. A unique inverse of a private key, i.e. the corresponding public key, may be constructed if the message is relatively prime to encryption coefficients, i.e., a numerator and denominator. The term relative prime as applied to two numbers implies that the greatest common denominator (GCD) of the two numbers is equal to '1', i.e. the two numbers have no factors greater then '1' in common.

One embodiment of the disclosed technology employs relative prime numbers in conjunction with knapsack encryption to encrypt and decrypt messages. Knapsack encryption involves a "knapsack," which is a defined as a finite set, or array, of numbers. The "subset-sum" problem as related to knapsacks is, "Given a set of numbers, or knapsack, find a subset of the numbers that add up to a given number. In a typical knapsack, there is no known algorithm in polynomial time for solving the subset-sum problem. However, with respect to a particular type of knapsack, i.e. a "super-increasing knapsack," the problem is trivial. A super-increasing knapsack is a knapsack in which each subsequent number is greater than the sum of all the previous numbers.

In one embodiment, the disclosed technology generates two relative prime numbers and, then, uses the two relative prime numbers in a public key encryption system. In another embodiment, two relative prime numbers are used in as private key, knapsack encryption system by converting a super-increasing (SI) knapsack into a non-super-increasing (NSI) knapsack. The NSI knapsack becomes a public key and the corresponding SI knapsack, along with the two relative prime numbers, becomes a private key. Using techniques that will be familiar to those with skill in the relevant arts, a message is encrypted using as subset S of the private key that totals at number N. The message, the public key and the number N are transmitted to a recipient, who knows the value of the two relative prime numbers. The recipient uses the relative prime numbers to convert the public key into the private key and, then, generates the subset S by solving the private key with respect to the number N. Using the subset, the message is decrypted.

It should be noted that although the claimed subject matter is described with respect to a knapsack cryptography system, the disclosed techniques may also be applied to any encryption algorithm of the following form: (Message*Encryption Key) modulo (number), where number>length of a packet to be encrypted.

Turning now to the figures, FIG. 1 is a block diagram of an exemplary computing architecture 100 that incorporates the claimed subject matter. A first computing system, i.e. "computing system 1" 102 includes a central processing unit (CPU) 104 with one or more processors (not shown), coupled to a monitor 106, a keyboard 108 and a pointing device, or "mouse," 110, which together facilitate human interaction with computing architecture 100 and computing system_1 102. Also included in computing system_1 102 and attached to CPU 104 is a computer-readable storage medium (CRSM) 112, which may either be incorporated into client system 102 ie, an internal device, or attached externally to CPU 104 by means of various, commonly available connection devices such as but not limited to, a universal serial bus (USB) port (not shown), CRSM 112 is illustrated storing an operating system (OS) 114 and logic associated with a Security .Management Module (SMM) 116. Also coupled to computing system_1 102 is a network adapter (NA) 118 that provides communication services between computing system_1 102 and the Internet 120.

A second computing system, i.e. "computing system_2," 122 is also coupled to the Internet 120 via a NA 119. Like computing system_1 102, computing system_2 122 includes a CPU 124 with one or more processors (not shown), a monitor 126, a keyboard 128, a mouse 130 and a CRSM 132. Like CRSM 112, CRSM 132 is illustrated storing an OS 134 and logic associated with a SMM 136. Although computing system_1 102 and computing system_2 122 are communicatively coupled via the Internet 120, they could also be coupled through any number of communication mediums such as, but not limited to, a local area network (LAN) (not shown), a wide area network (WAN), direct wires and the public telephone system (not shown).

It should be noted that a typical computing architecture would include might typically include more components and computing systems, but for the sake of simplicity a few of each are shown. SMMs 116 and 136 are used throughout the rest of the Specification to provide examples of devices employed in communication between computing systems 102 and 122 in accordance with the claimed subject matter. SMMs 116 and 136 are described in more detail below in conjunction with FIGS. 2-8.

Figure 2:
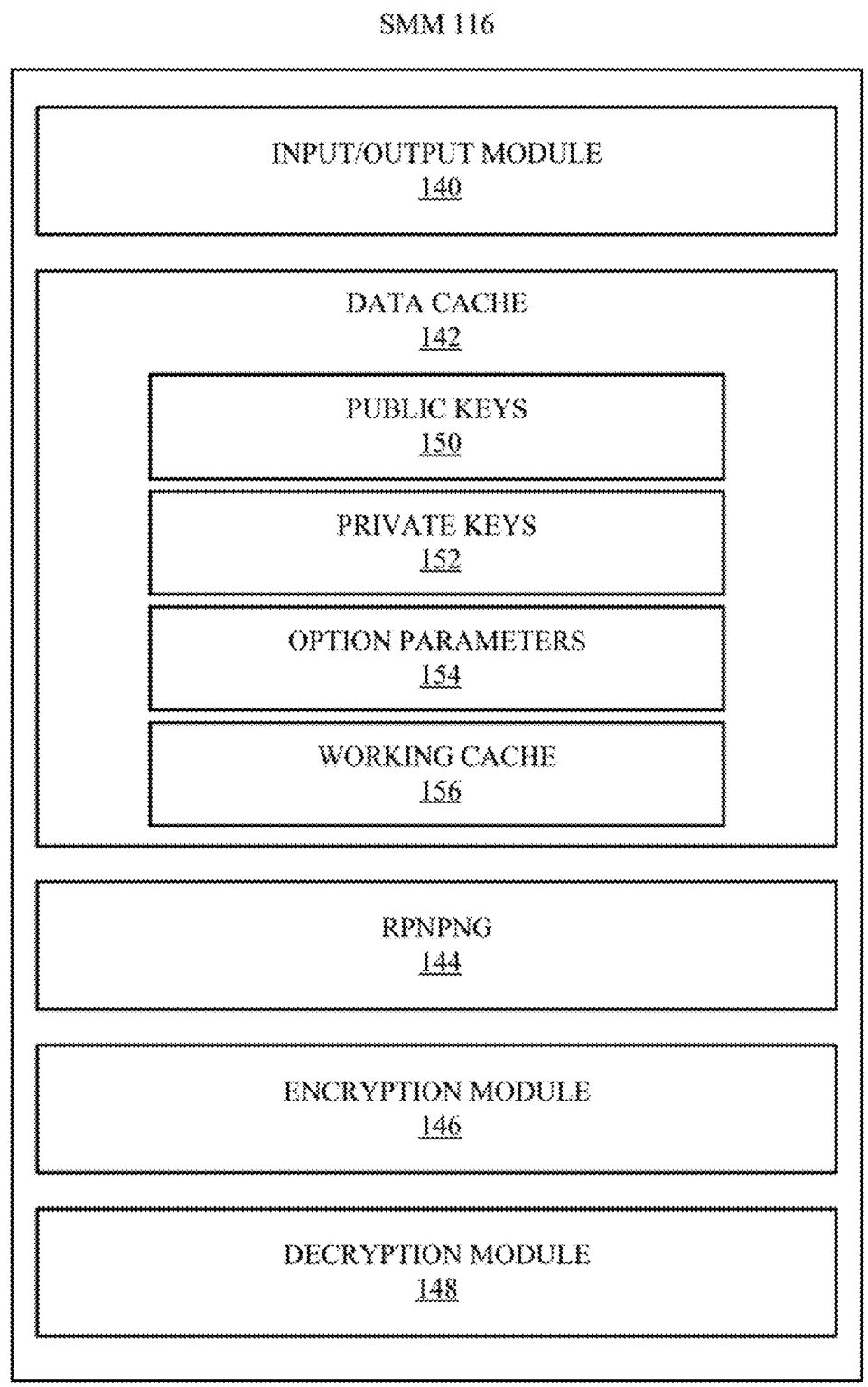
FIG. 2 is a block diagram of a Secure Message Module (SMM) that may implement the claimed subject matter.

FIG. 2 is a block diagram of SMM 116, first introduced above in conjunction with FIG. 1, in greater detail. In the following examples, logic associated with SMM 116 is stored on CRSM 112 (FIG. 1) and executed on one or more processors (not shown) of CPU 104 (FIG. 1) of computing system 102 (FIG. 1). Logic associated with SMM 116 is also stored on CRSM 132 and executed on one or more processors (not shown) of CPU 124 (FIG. 1) of computing system 122 (FIG. 1). Various processes associated with SMM 116 will be described as executing either on computing system_1 102 or computing system_2 122, depending upon whether the example is of a transmission or reception of a message. Of course it should be understood that both computing system_1 102 and computing system_2 122 may transmit and receive messages in accordance with the claimed subject matter.

SMM 116 includes an input/output (I/O) module 140, a data cache component 142, a Relative Prime Non-Prime Numbers Generator (RPNPNG) 144, an encryption module 146 and a decryption module 148. It should be understood that the claimed subject matter can be implemented in many types of computing systems and data storage structures but, for the sake of simplicity, is described only in terms of computer 102 and computing architecture 100 (FIG. 1). Further, the representation of SMM 116 in FIG. 2 is a logical model. In other words, components 140, 142, 144, 146 and 148 may be stored in the same or separates files and loaded and/or executed within computing architecture 100 either as a single system or as separate processes interacting via any available inter process communication (IPC) techniques.

I/O module 140 handles any communication SMM 116 has with other components of system 100. Data cache 142 is a data repository for information, including parameters that SMM 116 requires during normal operation. Examples of the types of information stored in data cache 142 include public keys 150, private keys 152, option parameters 154 and a working cache 156.

Figure 3:
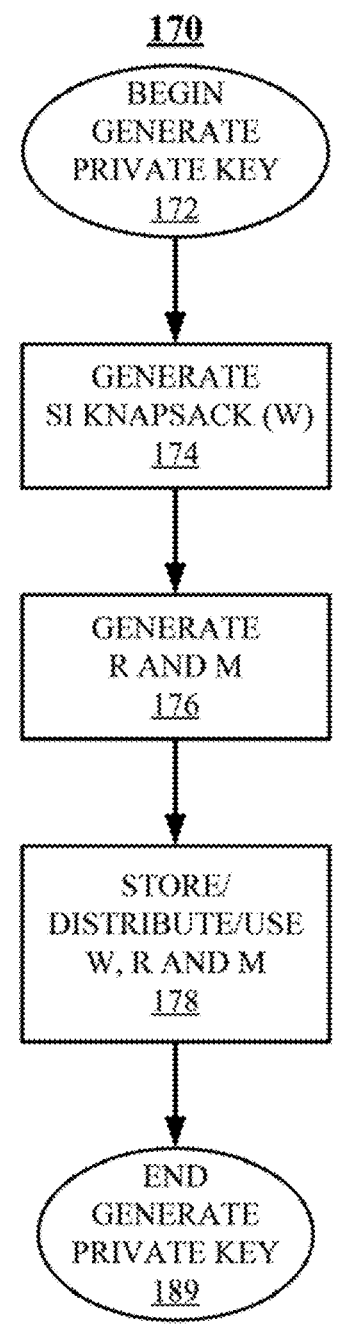
FIG. 3 is a flowchart of a Generate Private Key process, executed by the SMM of FIG. 2, which may implement aspects of the claimed subject matter.
Figure 4:
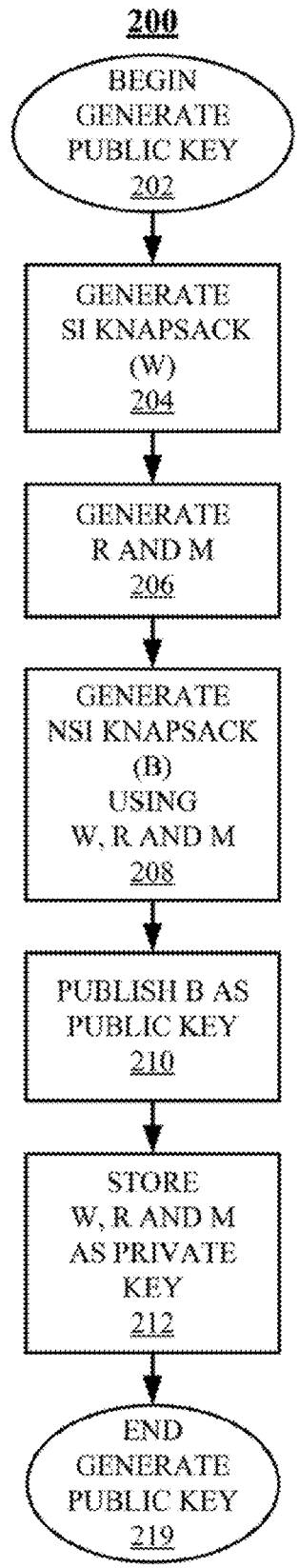
FIG. 4 is a flowchart of a Generate Public Key process, executed by SIMM of FIG. 2, which may implement aspects of the claimed subject matter.

Public keys 150 stores public keys generated in accordance with the disclosed technology (see 200, FIG. 4). Private keys 152 stores private keys generated in accordance with the disclosed technology (see 170, FIG. 3). Option parameters 156 includes information on various user and administrative preferences that have been set such as, but not limited to, the length of generated keys under different scenarios and the size of blocks in which a message to be encrypted is to be parsed.

RPNPNG 144 generates relative prime non-prune numbers employed in the disclosed technology. As explained above, two numbers are relatively prime if the only shared factor is the number Neither of the two numbers are required to be a prime number. In the following description, the two numbers are referred to as the modulus (M) and the multiplier (R). M and R are calculated according to the following formulas to ensure they are relative prime non-prime numbers:

$$R = P^I$$

$$M = (P^N * Q^T) - 1.$$

The parameters P, I, N, Q and T are selected so that R and M meet certain other criteria, some of which are specified in options parameters 154 of data cache 142 and described in more detail below in conjunction with FIGS. 3-8. Criteria include, but are not limited to, P and Q do not need to be prime numbers; N>1; and, as a result of the operations, M is greater than the length of any particular packet in a message to be encrypted.

Figure 5:
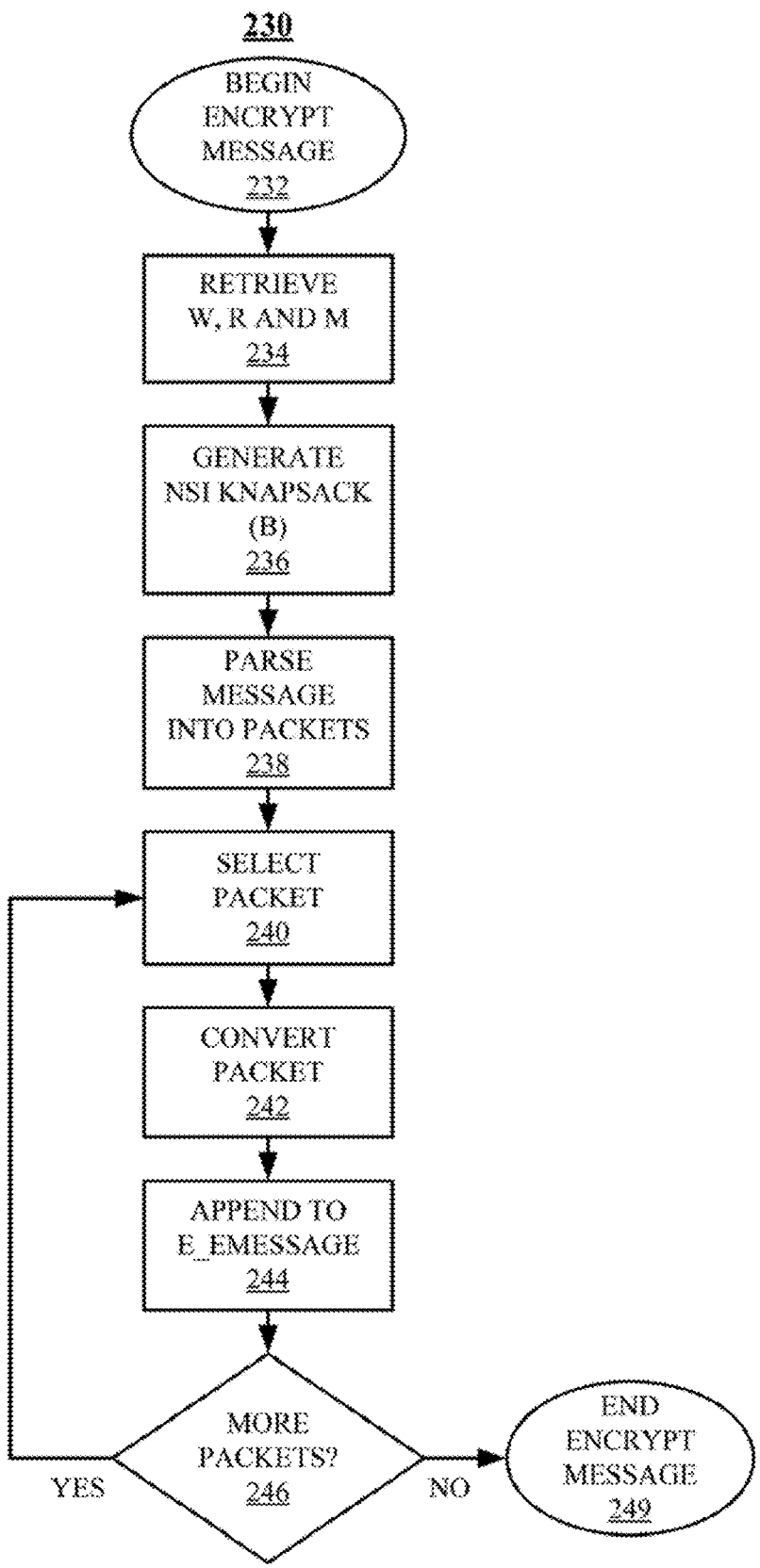
FIG. 5 is a flowchart of an Encrypt Message process that employs a private key generated by the Generate Private Key process of FIG. 4.

Encryption module 146 converts a message to be transmitted into an encrypted message, or an "e_message" (see 230, FIG. 5). Decryption module 148 converts a e_message into a clear text message (see 300, FIG. 7). Components 142, 144, 146, 148, 150, 152, 154 and 156 are described in more detail below in conjunction with FIGS. 3-8.

FIG. 3 is a flowchart of a Generate Private Key process 170, executed by SMM 116 (FIGS. 1 and 2), which may implement aspects of the claimed subject matter. In this example logic associated with process 170 is stored on CRSM 112 (FIG. 1) and executed on one or more processors of CPU 104 (FIG. 1) of computing system_1 102 (FIG. 1).

Process 170 starts in a "Begin Generate Private Key" block 172 and proceeds immediately to a "Generate Super-Increasing (SI) Knapsack (W)" ( block 174. As explained above a SI knapsack is an array of numbers in which each number is greater than the sum of the numbers listed before in the array. The size of the knapsack. i.e. the number of elements, depends upon information stored in options parameter 154 (FIG. 2). Specifically, the size of the generated SI knapsack (W) is typically equal to the number of bits in each block of a number of blocks that make up a message to be encrypted. For example, if a message is composed of ten (10) blocks, each block equal to one (1) byte, or eight (8) bits, then a knapsack with eight (8) elements is generated. It should be understood that this is one simple example and messages would typically be much larger and, depending upon information stored in configuration options 154, the size of the blocks of the message may also be much longer.

During processing associated with a "Generate Multiplier (R) and Modulus (M)" block 176, an R and M are generated according to the formula described above in conjunction with RPNPNG 144 (FIG. 2). In addition, parameters P, I, N, Q and T are selected so that M is larger than the sum of the elements generated during processing associated with block 174 and R is a number in the range (1,q).

During processing associated with a "Store/Distribute/Use W, R and M" block 178, the SI knapsack (W) generated during processing associated with block 174 and the R and M generated during processing associated with block 176 become a private key and are stored in private keys 150 (FIG. 2) of data cache 142 (FIG. 2). It should be noted that one with skill in the relevant arts will understand techniques for storing, distributing to other parties and using such a private key. Finally, during processing associated with an "End Generate Private Key" block 189, process 170 is complete.

FIG. 4 is a flowchart of a Generate Public Key process 200, executed by SMM 116 (FIGS. 1 and 2), which may implement aspects of the claimed subject matter. In this example logic associated with process 200 is stored on CRSM 112 (FIG. 1) and executed on one or more processors of CPU 104 (FIG. 1) of computing, system_1 102 (FIG. 1).

Process 200 starts in a "Begin Generate Public Key" block 202 and proceeds immediately to a "Generate Super-Increasing (SI) Knapsack (W)" block 204. Like in process 170, the size of the knapsack, i.e. the number of elements, depends upon information stored in options parameter 154 (FIG. 2). Specifically, the size of the generated SI knapsack (W) is typically equal to the number of bits of each block in a number of blocks that make up a message to be encrypted. It should be understood that this is one simple example and messages would typically be much larger and, depending upon information stored in configuration options 154, the size of the blocks of the message may also be much longer.

During processing associated with a "Generate Multiplier (R) and Modulus (M)" block 204, an R and M are generated according to the formula described above in conjunction with RPNPNC 144 (FIG. 2), In addition, parameters P,L,N,Q and T are selected so that M is larger than the sum of the elements generated during processing associated with block 204 and R is a number in the range (1,q). During processing associated with a "Generate NSI Knapsack (B) Using W, R and M" block 208, a non-super increasing knapsack (B) is generated such that each element $E_i$ of B is equal to the corresponding element $F_i$ of W such that $E_i = F_i * R$ mod M. For example, if the first element ($E_i$) of W=2, R=588 and M=881, then the first element ($F_i$) of B=2*588 mod 881=295.

During processing associated with a "Publish B as Public Key" block 210, the NSI knapsack (B) generated during processing associated with block 208 is published as a public key. During processing associated with a "Store W, R and M" block 212, the SI knapsack (W) generated during processing associated with block 204 and the R and M generated during processing associated with block 206 become a private key that corresponds to the public key generated during processing associated with block 208 and published during processing associated with block 210 and are stored in private keys 150 (FIG. 2) of data cache 142 (FIG. 2). It should be noted that one with skill in the relevant arts will understand techniques for publishing a public key and storing and using a corresponding private key. Finally, during processing associated with an "End Generate Public Key" block 219, process 200 is complete.

FIG. 5 is a flowchart of an Encrypt Message process 230 that may be employed in conjunction with either a private key generated by Generate Private Key process 170 of FIG. 3 or a public key generated by Generate Public Key process 200 of FIG. 4. In this example, logic associated with process 230 is stored on CRSM 112 (FIG. 1) and executed in conjunction with SMM (FIGS. 1 and 2) on one or more processors of CPU 104 (FIG. 1) of computing system_1 102 (FIG. 1).

Process starts in a "Begin Encrypt Message" block 232 and proceeds immediately to a "Retrieve W, R and M" block 234. During processing associated with block 234, a SI knapsack (W), a multiplier (R) and a modulus (M) are retrieved from private keys 150 of data cache 142 of SMM 116 (see 178, FIG. 3 and 212, FIG. 4). During processing associated with a "Generate NSI Knapsack (B)" block 236, the W, R and M retrieved during processing associated with block 234 are used to generate a non-super increasing (NSI) knapsack (B). One example of a process for such a conversion is to base each element ($F_i$) of B on a corresponding element ($E_i$) oF W in accordance with the formula, $F_i = E_i * R$ mod M (see 208, FIG. 4).

During processing associated with a "Parse Message Into Packets" block 238, the message to be encrypted is divided into equal sized packets, or blocks of bits. Typically each packet contains a number of bits equal to the number of elements in knapsack B, generated during processing associated with block 236. During processing associated with a "Select Packet" block 240, a first packet is selected. Packets are typically selected in the order the packets occur in the message. For example, the first time through block 240, the first packet of the message to be encrypted is selected.

Figure 6:
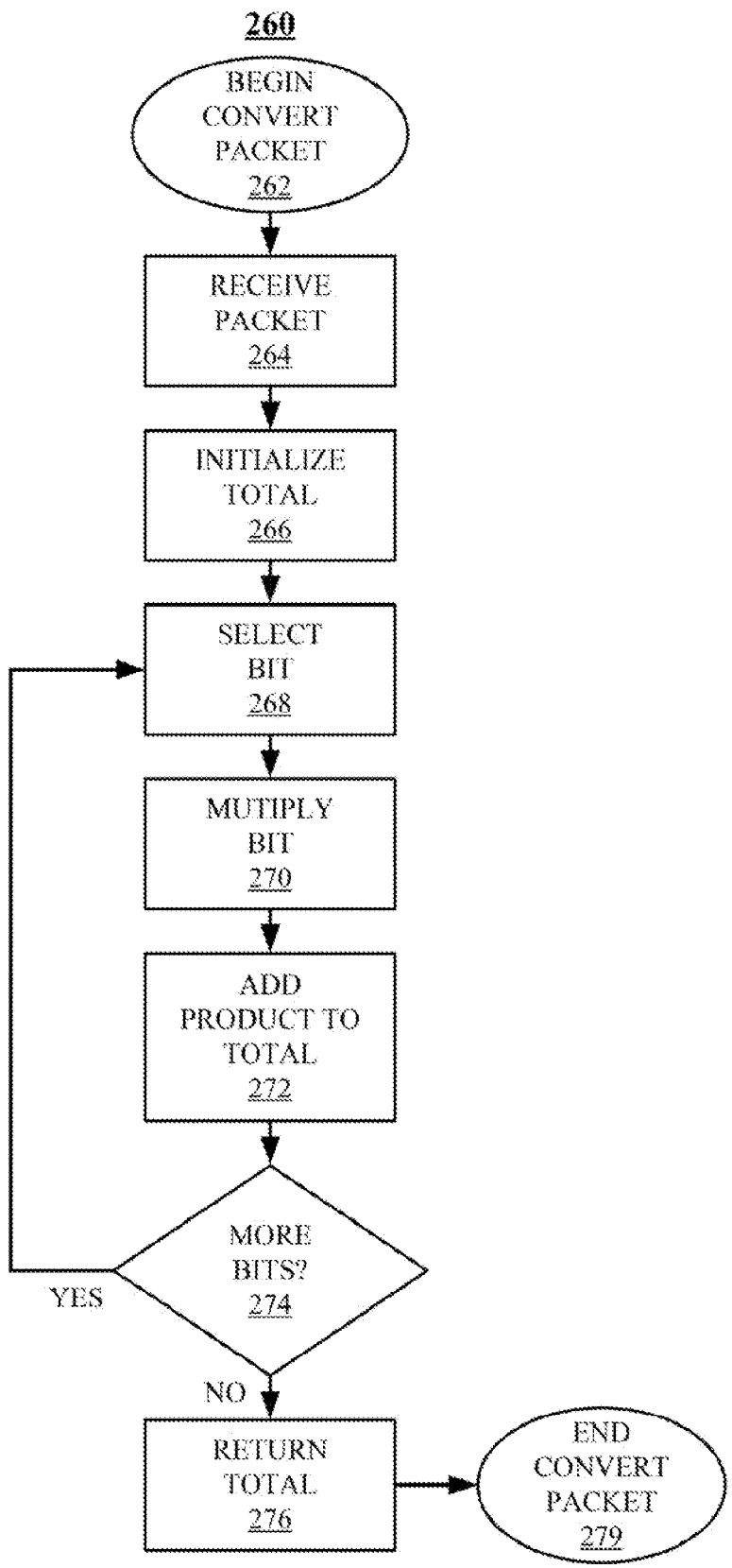
FIG. 6 is a flowchart of a Convert Packet process employed in conjunction with the Encrypt Message process of FIG. 5.

During processing associated with a "Convert Packet" block 242, the bits of the selected block are converted into a number based upon the elements of B (see 260, FIG. 6). During processing associated with an "Append to Encrypted Message (E_Message)" block 244, the number generated is appended to the encrypted message, or "e_message."

During processing associated with as "More Packets?" block 246, a determination is made as to whether or not there are additional packets to be converted in the message to be encrypted. If so, control returns to block 240, the next packet of the message is selected and processing continues as described above. If a determination is made that there are no more packets to be processed, control proceeds to an "End Encrypt Message" block 249 during which process 230 is complete. Although not shown, at this point the resultant e_message may be stored or transmitted to a user such as a user on computing system_2 122 (FIG. 1).

FIG. 6 is a flowchart of a Convert Packet process 260 employed in conjunction with Encrypt Message process 230 of FIG. 5. Like process 230, in this example, logic associated with process 260 is stored on CRSM 112 (FIG. 1) and executed in conjunction with SMM (FIGS. 1 and 2) on one or more processors of CPU 104 (FIG. 1) of computing system_1 102 (FIG. 1)

Process 260 starts in a "Begin Convert Packet" block 262 and proceeds immediately to a "Receive Packet" block 264. During processing associated with block 264, a packet for processing is received (see 240 and 242, FIG. 5). As explained above in conjunction with FIG. 5, the number of bits in a packet is typically equal to the number of dements in a NSI knapsack used to process the packet (see 236, FIG. 5). During processing associated with an "Initialize Total" block 266, a variable, or "total," is initialized to a value of '0'.

During processing associated with a "Select Bit" block 268, a bit of the packet is selected. Typically, bits are selected in the order that the bits appear in the packet received during processing associated with block 264. In other words, in this example, the first time through block 268, the first bit in the received packet is selected. During processing associated with a "Multiply Bit" block 270, the selected bit is multiplied by a corresponding element in B. In other words, the first bit is multiplied by the first element in B, the second bit is multiplied by the second element of B, and so on. During processing associated with an "Add Product to Total" block 272, the product calculated during processing associated with block 270 is added to the variable total.

During processing associated with a "More Bits?" block 274, a determination is made as to whether or not there are more bits in the packet received during processing associated with block 264 to be converted. If so, control returns to block 268, the next bit in received packet is selected and processing continues as describe above.

If, during processing associated with block 274, a determination is made that there are no more bits to be converted, control proceeds to a "Return Total" block 276. During processing associated with block 276, the variable total is return to the calling process so that it can be appended to the e_message being generated (see 244, FIG. 5). Finally, control proceeds to an "End Convert Packet" block 279 during which process 260 is complete.

Figure 7:
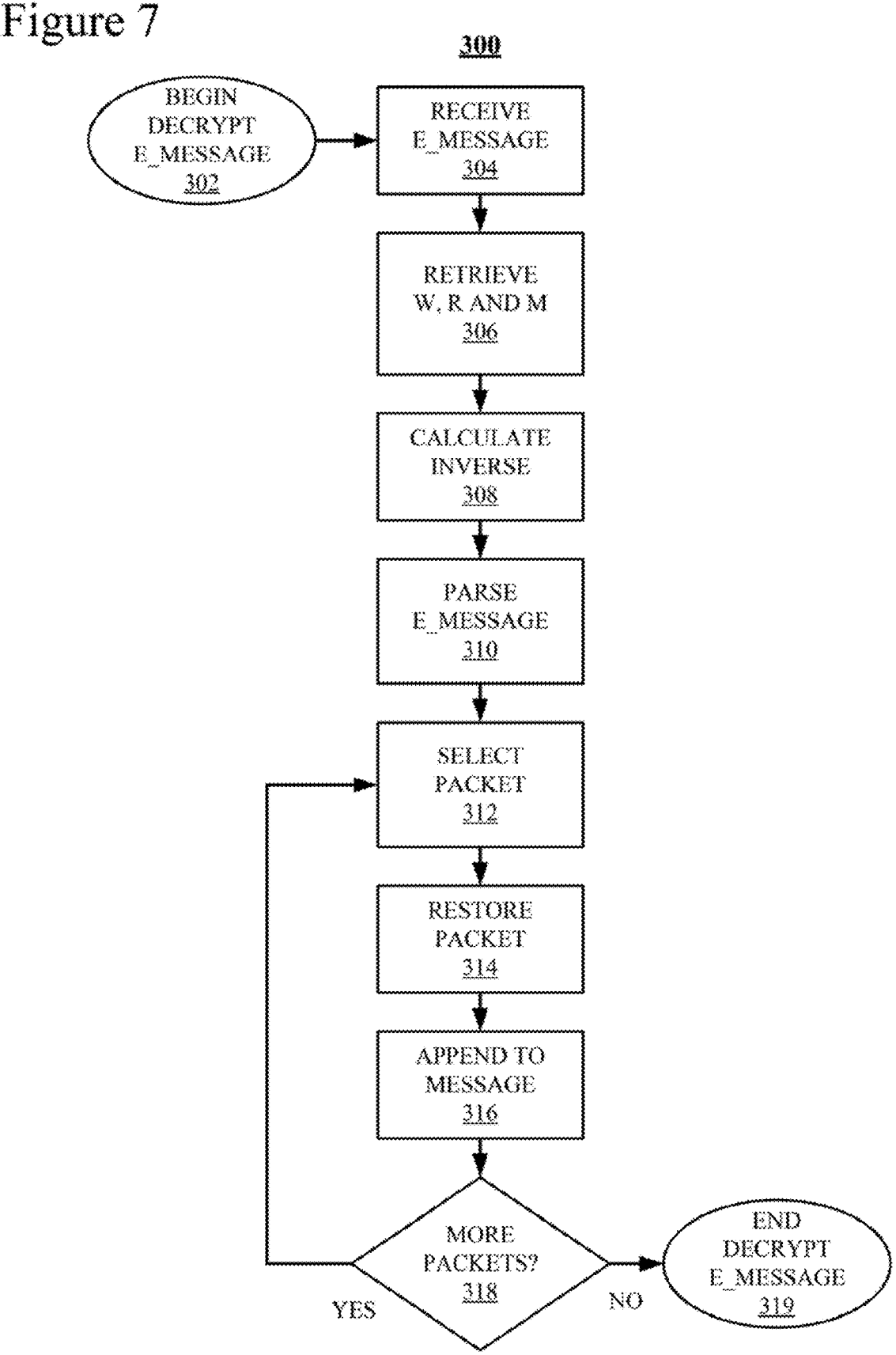
FIG. 7 is a flowchart of a Decrypt E_Message process that decrypts a message encrypted by the Encrypt Message process of FIG. 5.

FIG. 7 is a flowchart of a Decrypt E_Message process 300 that decrypts a message encrypted by Encrypt Message process 230 of FIG. 5. In this example, logic associated with process 300 is stored on CRSM 132 (FIG. 1) and executed in conjunction with SMM 136 (FIG. 1) on one or more processors of CPU 124 (FIG. 1) of computing system_2 122 (FIG. 1). It should be noted that process 300 is applicable to both public key and private key techniques. Any differences in the processing of public and private key techniques will be noted.

Process 300 starts is a "Begin Decrypt E_Message" block 302 and proceeds immediately to a "Receive E_Message" block 304. During processing associated with block 304, an e_message is received. In this example, the received e_message has been transmitted from computing system_1 102 (FIG. 1) after being encrypted in accordance with the claimed subject matter (see 230, FIG. 5). During processing associated with a "Retrieve W, R and M" block 306, a SI knapsack W, a multiplier R and the modulus M that were used to encrypt the e_message received during processing associated with block 304 are retrieved from a private key area (not shown) of SMM 136 that is similar to private keys 152 (FIG. 2) of data cache 144 (FIG. 2) of SMM 116 (FIGS. 1 and 2).

During processing associated with a "Calculate inverse" block 308, an inverse (I) calculated according to the formula $I=R^{-1}$ mod M is generated, specifically $R^{-1}=(P^{N-1}*Q^T)$ such that $R \cdot R^{-1}$ mod M=1 During processing associated with as "Parse E_Message" block 310, the received e_message is divided into packets corresponding to the length of packets in the original message (see 238, FIG. 5). During processing associated with a "Select Packet" block 312, a packet is selected for processing. Typically packets are processed in the order they occur in the e_message. During processing associated with a "Restore Packet" block 314, the selected packet is restored to a clear text format corresponding to the original message (see 350, FIG. 8). During processing associated with an "Append to Message" block 316, the packet restored during processing associated with block 314, is appended to a decrypted message.

During processing associated with a "More Packets?" block 318, a determination is made as to whether or not there are additional packets to be restored in the e_message. If so, control returns to block 312, the next packet of the message is selected and processing continues as described above. If a determination is made that there are no more packets to be processed, control proceeds to an "End Decrypt E_Message" block 319 during which process 300 is complete.

Figure 8:
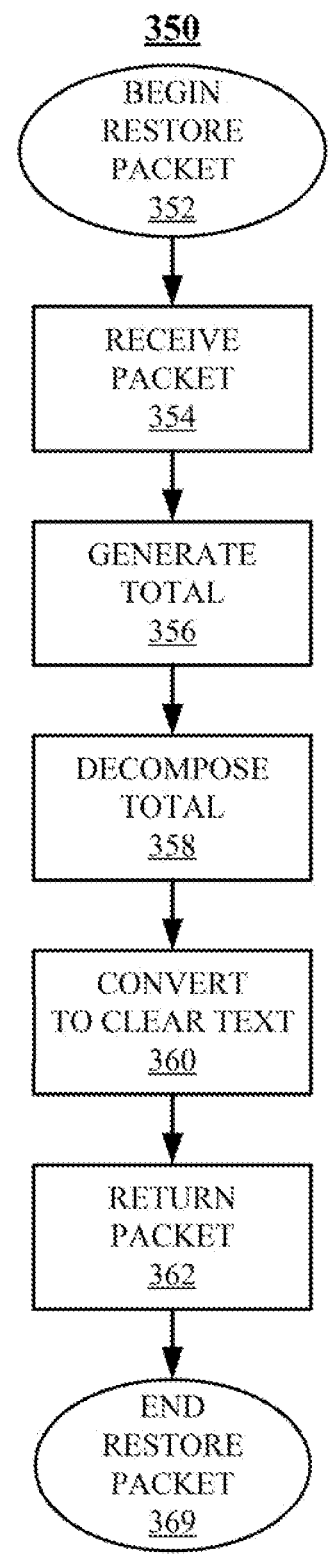
FIG. 8 is a flowchart of a Restore Packet process employed in conjunction with Decrypt E_Message process of FIG. 7.

FIG. 8 is a flowchart of a Restore Packet process 350 employed in conjunction with Decrypt Message process 300 of FIG. 7. Like process 300 (FIG. 7), in this example, logic associated with process 350 is stored on CRSM 132 (FIG. 1) and executed in conjunction with SMM 136 (FIG. 1) on one or more processors of CPU 124 (FIG. 1) of computing system_2 122 (FIG. 1).

Process 350 starts in a "Begin Restore Packet" block 352 and proceeds immediately to a "Receive Packet" block 354. During processing associated with block 354, a packet is received for processing (see 312 and 314, FIG. 7). During processing associated with a "Generate Total" block 356, the packet is multiplied by the inverse (I) described, above (see 308, FIG. 7). During processing associated with a "Decompose Total" block 358, the total generated during processing associated with block 356 is processed by generating a binary number in which each hit that is set corresponds to an element of the SI knapsack W that is required to add up to the total.

During processing associated with a "Convert to Clear Text" block 360, the binary number generated during processing associated with block 358 is converted into a corresponding character. During processing associated with a "Return Packet" block 362, the character is returned to the calling program for inclusion in the decrypted, clear text message (see 316, FIG. 7). Finally, control proceeds to an "End Restore Packet" block 369 during which process 350 is complete.

The terminology used herein is fur the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams ma represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
   selecting a non-prime multiplier (R) in accordance with a formula $R=P^I$ wherein P is a prime number and I a number is selected such that $P^I$ is less than the number of bits in every packet of a plurality of packets, the plurality of packets corresponding to a message;
   generating a non-prime modulus (M) wherein M is generated in accordance a formula $M=(P^N*Q^T)-1$, where N, Q and T are numbers selected such that M is greater than the number of bits in every packet of the plurality of packets and N>1, wherein M and R are relative prime numbers;
   employing M and R, in accordance with a cryptography system, to encrypt each packet of plurality of packets to generate a plurality of encrypted packets;

aggregating the plurality of encrypted packets to generate an encrypted message; and transmitting the encrypted message.

2. The method of claim 1, where in the cryptography system is a public key system.

3. The method of claim 1, user in the cryptography system is a private key system.

4. The method of claim 3, wherein the private key system is a knapsack encryption system.

5. The method of claim 1, wherein the cryptography system is of the form (a message*an encryption key) modulo (a number), where the number>length of a packet to be encrypted.

6. The method of claim 1, further comprising:

generating an inverse key in accordance with the formula $R^{-1}=(P^{N-1}*Q^T)$ such that $R \cdot R^{-1}$ mod $M=1$; and decrypting the message by employing the inverse key.

* * * * *